W. B. WILLIS.
COMBINATION HOE AND PLOW.
APPLICATION FILED SEPT. 25, 1911.
1,032,719.
Patented July 16, 1912.
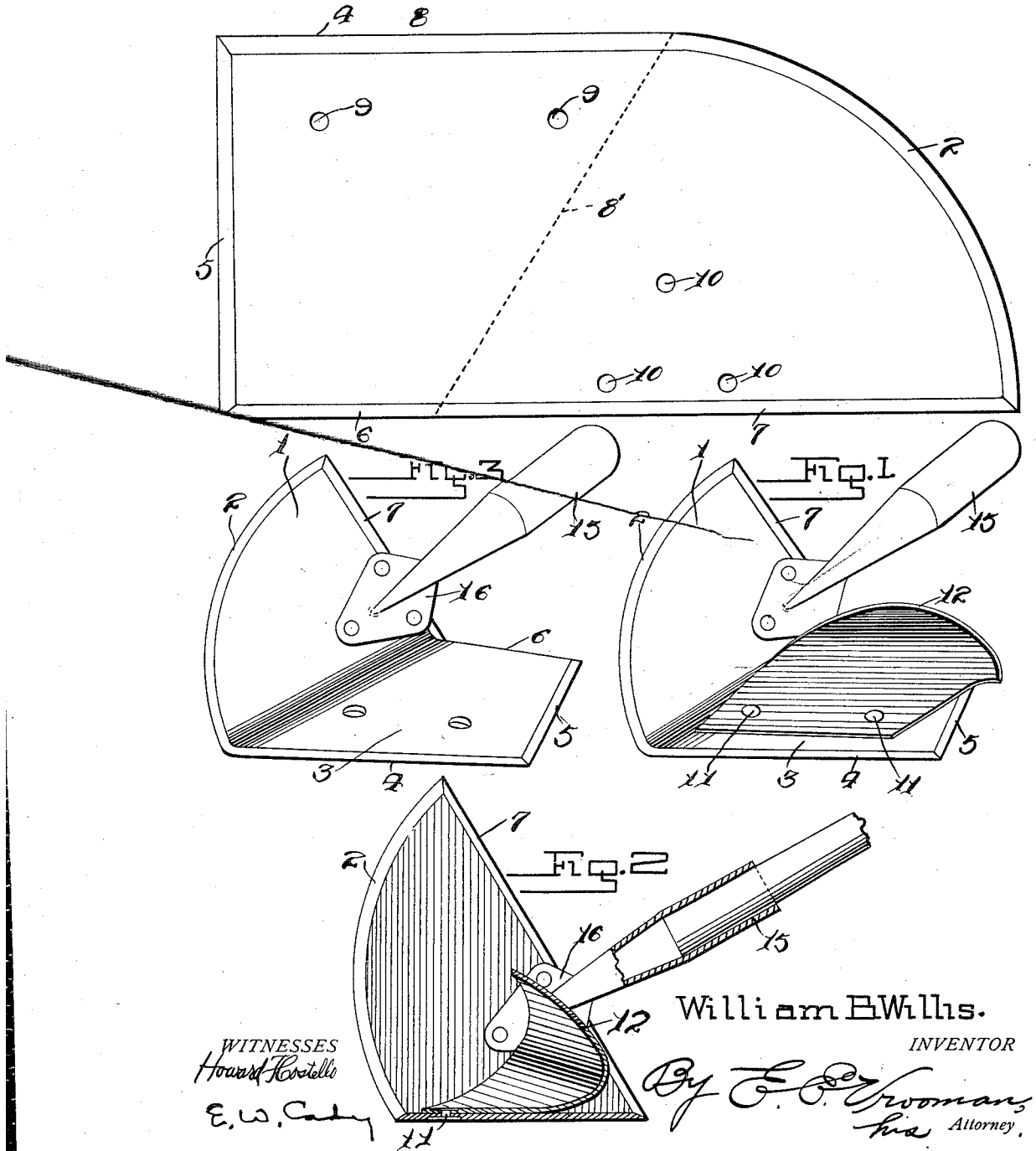

UNITED STATES PATENT OFFICE.

WILLIAM B. WILLIS, OF PALACIOS, TEXAS, ASSIGNOR OF ONE-HALF TO VICTOR E. MELBERG, OF PALACIOS, TEXAS.

COMBINATION HOE AND PLOW.

1,032,719. Specification of Letters Patent. Patented July 16, 1912.

Application filed September 25, 1911. Serial No. 651,233.

*To all whom it may concern:*

Be it known that I, WILLIAM B. WILLIS, a citizen of the United States, residing at Palacios, in the county of Matagorda and State of Texas, have invented certain new and useful Improvements in Combination Hoes and Plows, of which the following is a specification, reference being had therein to the accompanying drawing.

This invention relates to a garden tool known as a hoe and edge trimmer used for trimming the edges of lawns, walks, and flower beds, and which also may be used as a weeding hoe and sod cutter.

The invention has for its object to provide an improved hoe and edge trimmer by means of which in addition to its ordinary use it will so penetrate the earth as to cause the roots of grass and weeds turned up thereby to lie in the sun and out of position so that they cannot take root again.

The invention consists of an improved hoe and edge trimmer constructed as hereinafter set forth and claimed.

Referring to the accompanying drawings: Figure 1 is a view of an improved hoe and edge trimmer constructed in accordance with this invention. Fig. 2 is a similar view in cross section on the line X—X, Fig. 1. Fig. 3 is a view of the tool with the mold board removed. Fig. 4 is a blank from which the cutting blades of the tool are formed.

In carrying out the invention the tool is formed with an upright blade 1 having a front arc shaped cutting edge 2 and with a horizontal blade 3 extending laterally from the upright blade 2 and provided with a front cutting edge 4 located at an incline to the plane of the blade 1 and with a side cutting edge 5 located at an angle to the cutting edge 4 and with a rear cutting edge 6 located at an angle to the inclined vertical rear cutting edge 7 of the blade 1.

The two blades just described are formed from a metal blank 8 having the several cutting edges 2, 4, 5, 6, and 7 as hereinbefore described, said blank being bent up on the diagonal line 8' extending across the blank, so as to bring the blades 1 and 3 into the relative positions described. The blank 8 is formed with the rivet holes 9 located so as to be adjacent to the front edge of the blade 3 and with the rivet holes 10 located so as to be adjacent to the rear edge 7 of the blade 1. Secured to the blade 3 by rivets 11 extending through the rivet holes 9 is a mold board 12 which extends over the top of the blade 3 in the position shown in Fig. 1 with the mold board projecting from one side beyond the cutting edge 5 of the blade 3. A pole handle 14 is provided which is secured at one end in a metallic socket 15 provided with a plate 16 which is riveted to the blade 1 by means of rivets extending through the rivet holes 10 therein. The handle 14 is inclined to the blades as shown and is in line with the plane of the blade 1. The arrangement of the several inclined edges of the blades adapt the said edges to operate with a shear or draw cut, said cutting edges being inclined to the line of thrust or pull upon the handle. The horizontal blade may be used as a hoe for weeding and is operated by thrusting and pulling the same back and forth so that it may be conveniently used to weed about plants and close to fences and the like. The upright blade assists the operation of the hoe when used as a weeder since it cuts through the ground so that the horizontal blade may be easily thrust or pulled through the ground. The upright blade is also used as an edge trimmer for lawns, flower beds, or the like by thrusting it forward or pulling it backward bringing either its front curved edge 2 or its rear edge 7 into play. In addition to the function of the tool as just described the mold board 12 serves to turn the roots of grass and weeds up to the sun and let them lie so that they cannot take root again and is also very useful for throwing soil up to plants.

What I claim is:—

1. A combined hoe and edge trimmer comprising an upright blade having a front arc shaped cutting edge and a rear cutting edge inclined in a vertical plane, and a horizontal blade projecting from the upright blade and having front, side and rear inclined cutting edges, and a mold board secured adjacent the forward edge of said horizontal blade and projecting laterally above the side cutting edge of the horizontal blade.

2. A combined hoe and edge trimmer comprising an upright blade having a front arc shaped cutting edge and a rear cutting edge inclined in a vertical plane, and a horizontal blade projecting from the bottom of the upright blade at an angle thereto and having an inclined front cutting edge, and an inclined side cutting edge, and a rear cutting edge located at an angle to the rear cutting edge of the upright blade, a mold board mounted on the top of the horizontal blade, and a handle secured to the upright blade at its rear end, and inclined at an angle to the blades of the tool, said mold board having its forward edge secured adjacent the forward edge of the horizontal blade and curving upwardly and outwardly away from the upright blade, the end of the mold board projecting laterally across the cutting edge of the horizontal blade, said mold board further terminating short of the rear edges of the upright and horizontal blades.

In testimony whereof I hereunto affix my signature in presence of two witnesses.

WILLIAM B. WILLIS.

Witnesses:
O. L. SPARKS,
F. G. STUMP.

Copies of this patent may be obtained for five cents each, by addressing the "Commissioner of Patents, Washington, D. C."